United States Patent [19]
Carlson et al.

[11] Patent Number: 5,277,281
[45] Date of Patent: Jan. 11, 1994

[54] MAGNETORHEOLOGICAL FLUID DAMPERS

[75] Inventors: J. David Carlson, Cary; Michael J. Chrzan, Raleigh, N.C.

[73] Assignee: Lord Corporation, Erie, Pa.

[21] Appl. No.: 900,571

[22] Filed: Jun. 18, 1992

[51] Int. Cl.$^5$ .............................................. F16F 9/04
[52] U.S. Cl. ................................. 188/267; 188/298; 188/299; 188/318; 188/320; 188/322.14; 188/322.15; 188/322.22; 267/64.15; 267/140.14; 267/219
[58] Field of Search ............... 188/267, 298, 299, 318, 188/316, 320, 322.14, 322.15, 322.22; 267/64.15, 140.14, 219, 220; 280/707

[56] References Cited

U.S. PATENT DOCUMENTS

| | | | |
|---|---|---|---|
| 2,557,140 | 6/1951 | Razdowitz | 285/109 |
| 2,575,360 | 11/1951 | Rabinow | 192/21.5 |
| 2,635,483 | 4/1953 | Welsh | 74/574 |
| 2,661,596 | 12/1953 | Winslow | 60/52 |
| 2,661,825 | 12/1953 | Winslow | 192/21.5 |
| 2,663,809 | 12/1953 | Winslow | 310/78 |
| 2,667,237 | 1/1954 | Rabinow | 188/88 |
| 2,669,325 | 2/1954 | Raines | 188/1 |
| 2,692,582 | 10/1954 | Curci et al. | 121/38 |
| 2,733,792 | 2/1956 | Saxl | 192/21.5 |
| 2,846,028 | 8/1958 | Gunther | 188/88 |
| 2,886,151 | 5/1959 | Winslow | 192/21.5 |
| 2,940,749 | 6/1960 | Kemelhor | 267/1 |
| 2,973,969 | 3/1961 | Thall | 280/124 |
| 3,006,656 | 10/1961 | Schaub | 280/112 |
| 3,059,915 | 10/1962 | Kemelhor | 267/1 |
| 3,174,587 | 3/1965 | Walton | 188/87 |
| 3,321,210 | 5/1967 | Delchev | 280/6 |
| 4,122,922 | 10/1978 | Baermann | 188/267 |
| 4,200,003 | 4/1980 | Miller | 74/574 |
| 4,351,515 | 9/1982 | Yoshida | 267/8 R |
| 4,401,298 | 8/1983 | Eaton et al. | 267/140.1 |
| 4,416,445 | 11/1983 | Coad | 267/35 |
| 4,544,048 | 10/1985 | Hoffman | 188/251 A |
| 4,673,067 | 6/1987 | Münning et al. | 188/299 |
| 4,679,775 | 7/1987 | Funaki et al. | 367/64.27 |
| 4,699,348 | 10/1987 | Freudenberg | 248/550 |
| 4,741,519 | 5/1988 | Dubos et al. | 267/140.1 |
| 4,753,421 | 6/1988 | Makibayashi et al. | 267/140.1 |
| 4,789,142 | 12/1988 | Hoying et al. | 267/140.1 |
| 4,819,772 | 4/1989 | Rubel | 188/299 |
| 4,844,220 | 7/1989 | Maji et al. | 188/267 |
| 4,869,476 | 9/1989 | Shtarkman | 267/140.1 |
| 4,896,752 | 1/1990 | Shtarkman | 188/299 |
| 4,899,996 | 2/1990 | Maassen et al. | 267/140.1 |
| 4,942,947 | 7/1990 | Shtarkman | 188/267 |
| 4,973,031 | 11/1990 | Takano et al. | 367/140.1 |
| 4,992,190 | 2/1991 | Shtarkman | 252/62.52 |
| 5,018,606 | 5/1991 | Carlson | 188/267 |
| 5,029,677 | 7/1991 | Mitsui | 188/267 |
| 5,080,392 | 1/1992 | Bazergui | 280/707 |

FOREIGN PATENT DOCUMENTS

| | | | |
|---|---|---|---|
| 3800678 | 2/1989 | Fed. Rep. of Germany | 188/267 |
| 1094516 | 5/1955 | France | 188/267 |
| 56-16330 | 2/1981 | Japan . | |
| 221034 | 12/1983 | Japan | 188/267 |
| 180742 | 7/1988 | Japan | 188/267 |
| 231031 | 9/1988 | Japan | 188/267 |
| 756107 | 8/1956 | United Kingdom | 188/267 |
| 1282568 | 7/1982 | United Kingdom | 188/267 |

Primary Examiner—Douglas C. Butler
Attorney, Agent, or Firm—Richard K. Thomson; Randall S. Wayland

[57] ABSTRACT

Magnetorheological (MR) fluid dampers are optimized. Dimensional relationships involved in the flow of magnetic flux are related to an operational parametric ratio of magnetic flux density in the fluid to the flux density in the steel. A magnetic valve is utilized to change the flow parameters of the MR fluid and, hence, the operational characteristics of the damper. Several embodiments depicting improved piston designs, including spool as well as toroidal configurations, are disclosed. In addition, both single and twin-tube housing designs are presented.

28 Claims, 13 Drawing Sheets

MAGNETORHEOLOGICAL FLUID DAMPERS

This application is a sister application of Ser. No. 07/900,567 filed contemporaneously herewith.

FIELD OF THE INVENTION

Incompressible fluids have been used in shock absorbers and other dampers, as well as in elastomeric mounts, for decades. The use of controllable fluids, electrorheological (ER) and magneto-rheological (MR) fluids, in dampers, was first proposed in the early 1950's by Winslow in U.S. Pat. No. 2,661,596. The use of a controllable fluid in a damper affords some intriguing possibilities relative to providing widely varying damping for varying conditions encountered by the damper. Nonetheless, the use of controllable fluids was generally restricted to the area of clutches, with a few exceptions, until the mid-1980's.

BACKGROUND AND SUMMARY OF THE INVENTION

Interest in the use of controllable fluids revived in the 1980's as activity in the area of controllable dampers increased. Most of the resurgent activity has occurred relative to ER dampers and associated fluids. While interest and development of ER fluid devices continues, performance of such systems have been disappointing from three standpoints:

1) the damping forces that can be generated by an ER fluid device are limited due to the relatively low yield strengths of the available fluids;
2) ER fluids are susceptible to contamination which significantly degrades performance; and,
3) the strong electric fields required by ER fluids necessitate complicated and expensive high-voltage power supplies and complex control systems.

Faced with these performance restrictions and searching for a technological breakthrough to overcome them, Applicants turned to MR fluids with renewed interest and sought to optimize systems employing them. MR fluids inherently have higher yield strengths and are, therefore, capable of generating greater damping forces. Further, contamination does not pose the performance degradation threat for MR fluids that it does for ER fluids. Still further, MR fluids are activated by magnetic fields which are easily produced by simple, low-voltage electromagnetic coils.

It is therefore among the objects of the present invention to provide an MR damper with improved performance characteristics. Enhancements include:
defining dimensional/operational relationships which provide improved performance;
devising piston designs in which the flow path for the magnetic flux is entirely contained within the piston itself;
providing an improved twin-tube cylinder design capable of use (with some modification) with either the self-contained or spool piston;
significantly reducing or eliminating MR fluid losses from the damper;
providing an improved fluid valve for controlling the flow of the MR fluid to produce the desired damping forces.

These and other objects of the invention are accomplished by an apparatus for variably damping motion using an MR fluid. The apparatus includes a housing for containing a volume of MR fluid; a piston adapted for movement within the housing, the piston being formed of ferrous metal, having a number, N, of windings of conductive wire incorporated therein to define a coil that produces magnetic flux in and around the piston; and having a configuration in which $$\frac{A_{core}}{A_{pole}}, \text{ and } \frac{A_{path}}{A_{pole}} \geq \frac{B_{opt}}{B_{knee}}$$

where $A_{core}$ is a minimum lateral cross-sectional area of the piston within the coil, $A_{path}$ is a minimum lateral cross-sectional area of magnetically permeable material defining a return path for the magnetic flux, $A_{pole}$ is the surface area of the piston's magnetic pole, $B_{opt}$ is an optimum magnetic flux density for the MR fluid, and $B_{knee}$ is a magnetic flux density at which the ferrous metal begins to saturate.

The housing may be provided with a sleeve of ferrous material to increase the cross-sectional area of the return flow path for the magnetic flux, $A_{path}$, for configurations in which the return path for the magnetic flux is through the housing. Alternatively, the housing may be a twin-tube design; the magnet may be formed on a spool-shaped piston or wound as a toroid thereon; the magnet could be positioned within the twin-tube housing rather than on the piston; loss of MR fluid can be prevented by topping the damper with a less dense fluid, using a scraper and seal combination, or using a sealless design. The piston may be formed from conventional ferrous materials (in either solid or laminate form) or from powdered metals. These features may be embodied in a mount as well as in a damper.

Other features, advantages and characteristics of the present invention will become apparent after a reading of the following detailed description.

DESCRIPTION OF THE PREFERRED EMBODIMENTS

Figure 1:
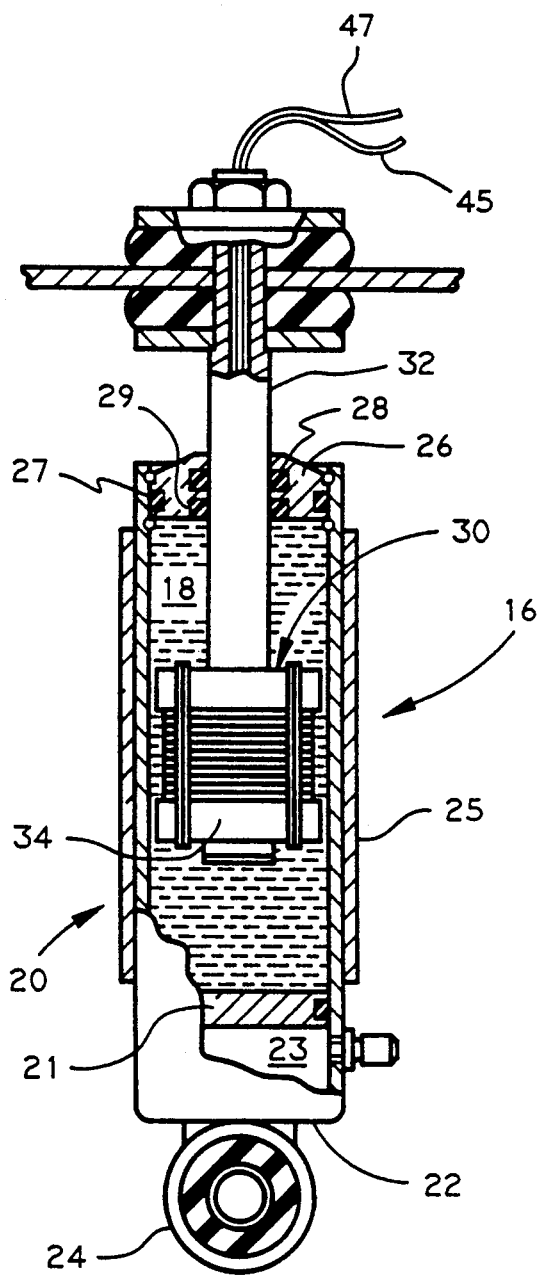
FIG. 1 is a side view in partial section of a first embodiment of the MR damper of the present invention.

A first embodiment of the damper of the present invention is depicted in FIG. 1 generally at 16. Damper 16 is made up of two principal components: housing 20 and piston 30. Housing 20 contains a volume of magnetorheological (MR) fluid 18. One fluid which has shown itself to be particularly well-suited for this application consists of carbonyl iron particles suspended in silicone oil. This MR fluid has a relative magnetic permeability between 3 and 15 at a magnetic flux density of 0.002 tesla (20 gauss). An MR damper has two principal modes of operation: sliding plate and flow (or valve) modes. Components of both modes will be present in every MR damper, with the force component of the flow mode dominating.

Housing 20 is a generally cylindrical tube with a first closed end 22 with an attachment eye 24 associated therewith. A cylindrical sleeve 25 may be affixed to the inner cylinder by any conventional means (e.g., press fit, welding, adhesive) to increase the cross-sectional surface area of housing 20, as will be discussed in greater detail hereafter. A second, or open, end of the cylinder is closed by end member 26. A first seal 27 extends about the outer periphery of member 26 to prevent fluid leakage between housing 20 and member 26. A second annular seal 28 is housed in a groove in the inner periphery of member 26 and seals against shaft 32. A scraper 29 can be used to wipe the MR fluid off the surface of shaft 32 so as to minimize loss of MR fluid past seal 28. As an additional means of preventing fluid loss, the upper regions of housing 20 can be filled with a second fluid which is immiscible with MR fluid or which can be separated from the MR fluid volume 18 by a floating baffle or rolling diaphragm (not shown).

Housing 20 is provided with a floating piston 21 to separate the MR fluid volume 18 from pressurized accumulator 23. While a floating piston 21 is shown, other types of accumulators can be used and, in fact, a flexible rolling diaphragm of the type shown in U.S. Pat. No. 4,811,819 is actually preferred. Accumulator 23 is necessary to accommodate fluid displaced by piston rod 32 as well as to allow for thermal expansion of the fluid.

Figure 2:
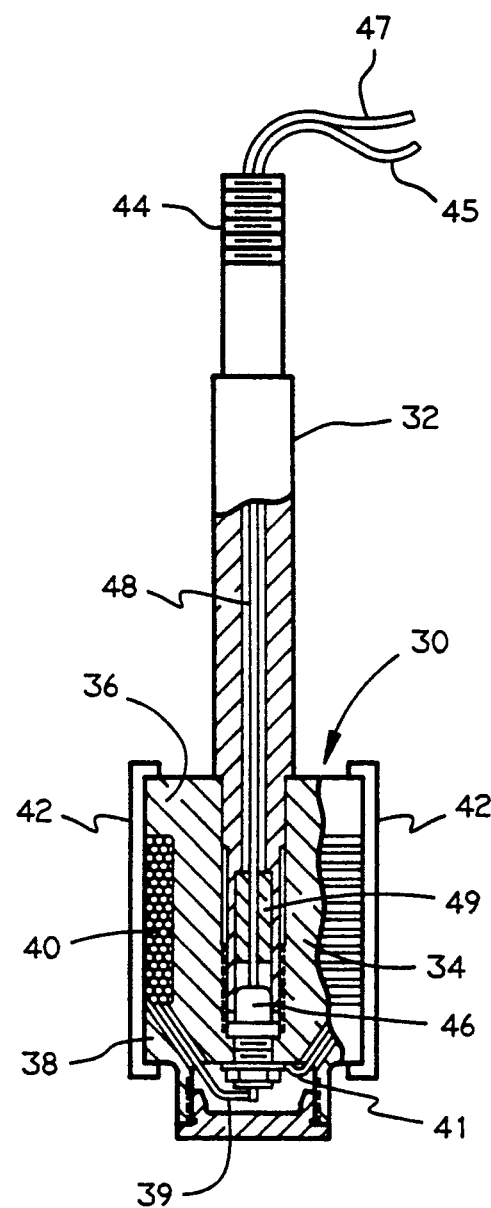
FIG. 2 is an enlarged side view in partial section of the piston assembly depicted in FIG. 1.

The first embodiment of piston assembly 30 is shown in greater detail in FIG. 2. Piston head 34 is spool shaped having an upper outwardly extending flange 36 and a lower outwardly extending flange 38. Coil 40 is wound upon spool-shaped piston head 34 between upper flange 36 and lower flange 38. Piston head 34 is made of a magnetically permeable material, such as low carbon steel, for example. Guide rails 42 are attached around the outside of piston head 34 at particular intervals. As shown in FIG. 1 and 2, four guide rails 42 are shown spaced uniformly about the periphery of piston head 34. Piston head 34 is formed with a smaller maximum diameter (in this case, $D_{pole}$, in FIG. 3) than the inner diameter, $D_I$ of housing 20. The external surfaces of guides 42 are contoured (radiused) to engage the inner diameter $D_I$ of housing 20. Guides 42 are made of non-magnetic material (e.g., bronze, brass, nylon, or Teflon® polymer) and maintain piston centered within gap 'g'. In this embodiment, gap g (in conjunction with coil 40) functions as a valve to control the flow of MR fluid 18 past piston 34.

Electrical connection is made to coil 40 through piston rod 32 by lead wires 45 and 47. A first wire 45 is connected to a first end of an electrically conductive rod 48 which extends through piston rod 32 to Phono-jack connector 46. The center connection of Phono-jack 46 is connected to a first end 39 of coil 40. The second end 41 of the windings of coil 40 is attached to a "ground" connection on the outside of Phono-jack 46. The electrical return path, then, includes piston rod 32 and the ground lead 47. The upper end of piston rod 32 has threads 44 formed thereon to permit attachment of damper 16, as depicted in FIG. 1. An external power supply, which provides a current in the range of 0–4 amps at a voltage of 12-24 volts, depending upon application, is connected to the leads 45 and 47. An epoxy bushing 49 keeps rod 48 isolated from return path through piston rod 32. The cavity surrounding conductive rod 48 may also be filled with epoxy. The outer surface of coil 40 may be coated with epoxy paint as a protective measure.

The damper 16 of this first embodiment functions as a Coulomb or Bingham type damper, i.e., this configuration approximates an ideal damper in which the force generated is independent of piston velocity and large forces can be generated with low or zero velocity. This independence improves controllability of the damper making the force a function of the magnetic field strength, which is a function of current flow in the circuit.

Figure 3:
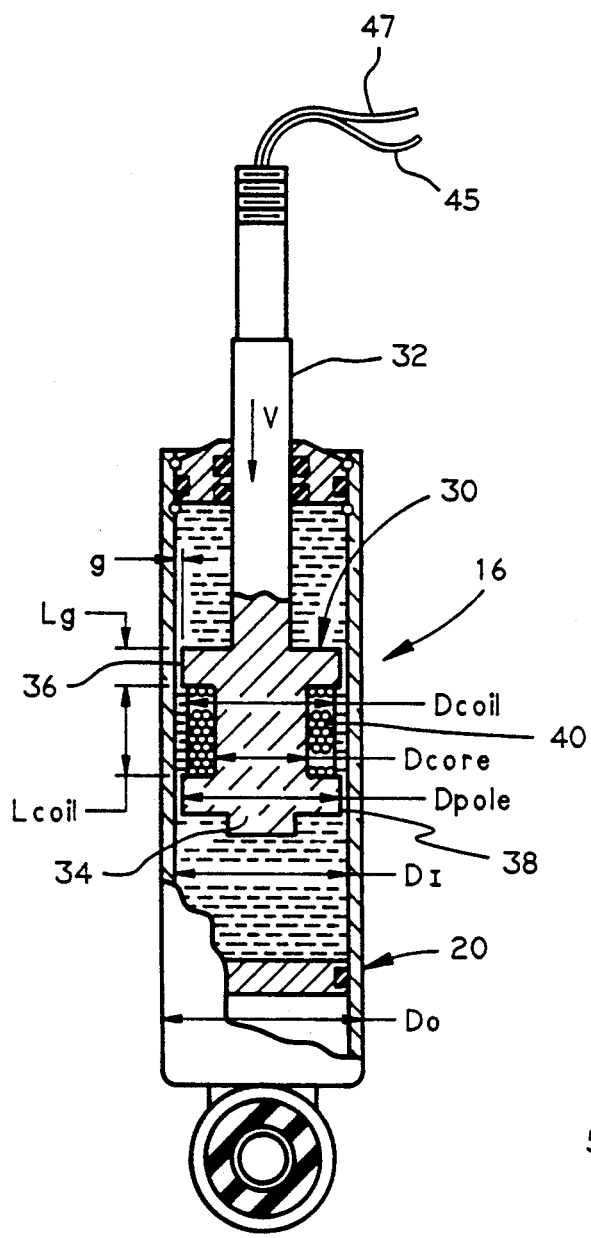
FIG. 3 is schematic side view in partial section depicting the dimensional relationships of the first embodiment, the internal details being omitted for simplicity and clarity.

FIG. 3 schematically depicts the dimensional relationships of the damper 16. The minimum diameter of the spool-shaped piston head 34 is the diameter of the core, $D_{core}$, and the diameter of the coil 40 is $D_{coil}$ while the length of the coil 40 is $L_{coil}$. As already noted, the gap or valve has a thickness g and the length of the pole is the width of flanges 36 and 38, which is also the length $L_g$ of gap g. The inside diameter of housing 20 is $D_I$, the outside diameter is $D_O$, the maximum diameter of the piston is $D_{pole}$ $$\left( \text{making } g = \frac{D_I - D_{pole}}{2} \right).$$

Efforts to optimize the performance of this embodiment of MR damper has led to identifying several key relationships interrelating dimensions to its operational parameters. In basic terms, the flow of magnetic flux will be heavily dependent on several critical "bottlenecks" in the flow path:

$A_{core}$—the minimum lateral cross-sectional area of piston head 34 within the windings of coil 40, having a value of $$\frac{\pi D_{core}^2}{4};$$

$A_{path}$—a minimum lateral cross-sectional area of magnetically permeable material defining a return path for magnetic flux, having a value of $$\frac{\pi (D_O^2 - D_I^2)}{4};$$

$A_{pole}$—a surface area of a magnetic pole of the piston, having a value of $\pi D_{pole} L_g$.

One design consideration is to minimize the amount of steel, i.e., to make $A_{core}$ and $A_{path}$ as small as possible. However, it has been found that the ratio of the bottlenecks $A_{core}$ and $A_{path}$ to $A_{pole}$ should be greater than a minimum threshold value defined by the ratio of the magnetic field strengths in the MR fluid and damper materials giving rise to a competing design consideration. That ratio is $$\frac{B_{opt}}{B_{knee}},$$

where $B_{opt}$ is an optimum magnetic flux density in the MR fluid and $B_{knee}$ is the magnetic flux density at which the ferrous metal begins to become saturated.

Figure 4:
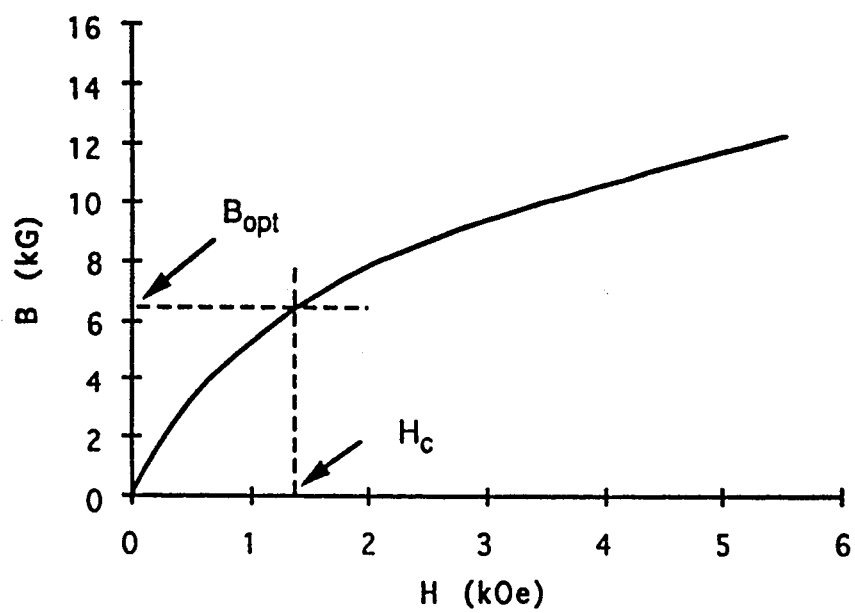
FIG. 4(a) is a graphic plot of flux density (B) vs magnetic field strength (H) for a particular MR fluid.
FIG. 4(b) is a plot of $B_{intrinsic}$ (J) vs field strength H for the same MR fluid.
FIG. 4(c) is a plot of $J^2$ vs H for the same MR fluid.
FIG. 4(d) is a plot of flux density (B) vs field strength (H) for a steel used in making the piston and housing of the present invention.
FIG. 4(e) is a plot of flux density (B) vs field strength (H) for a powdered metal used in making the piston and housing of the present invention.
Figure 4:
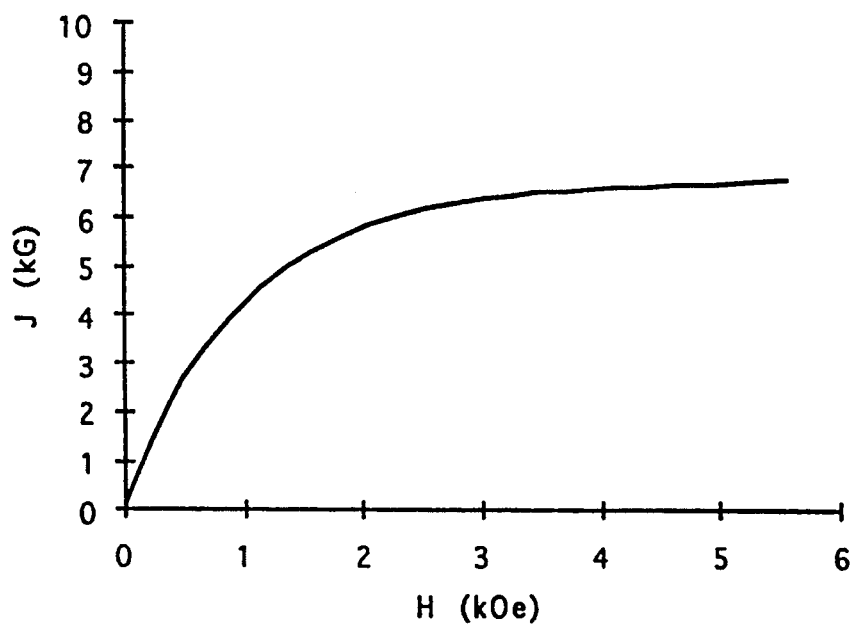
Figure 4:
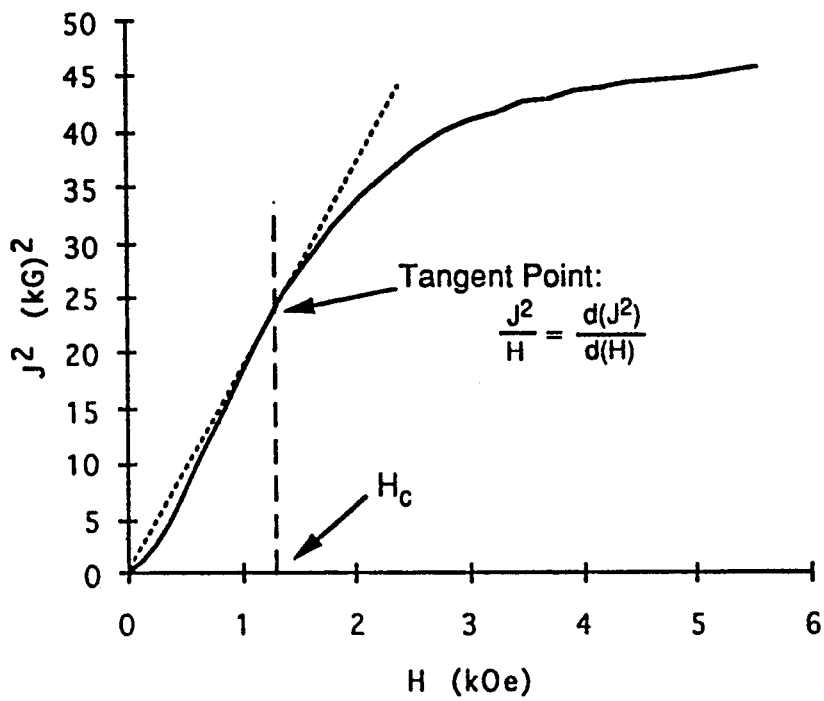
Figure 4:
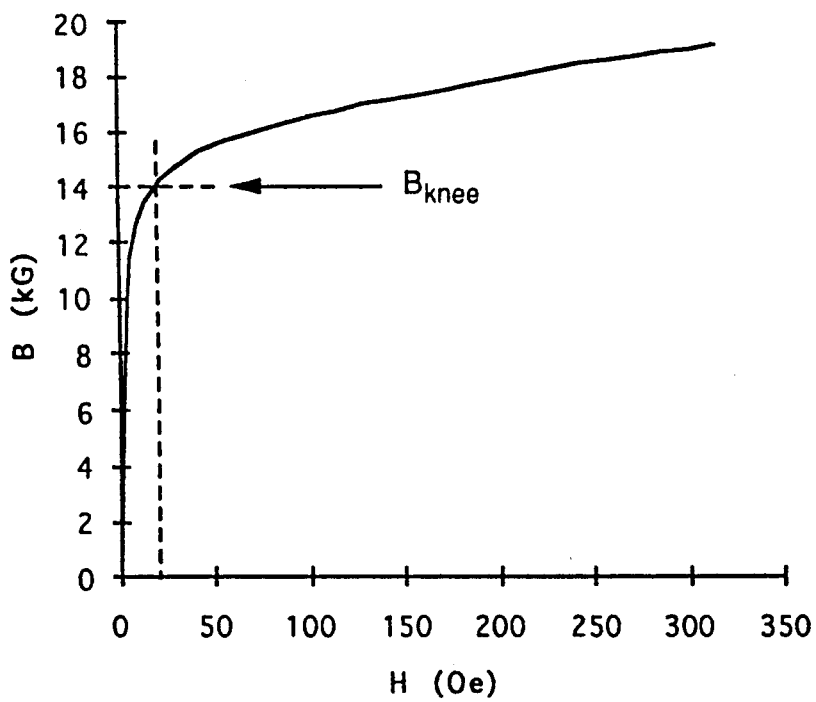
Figure 4:
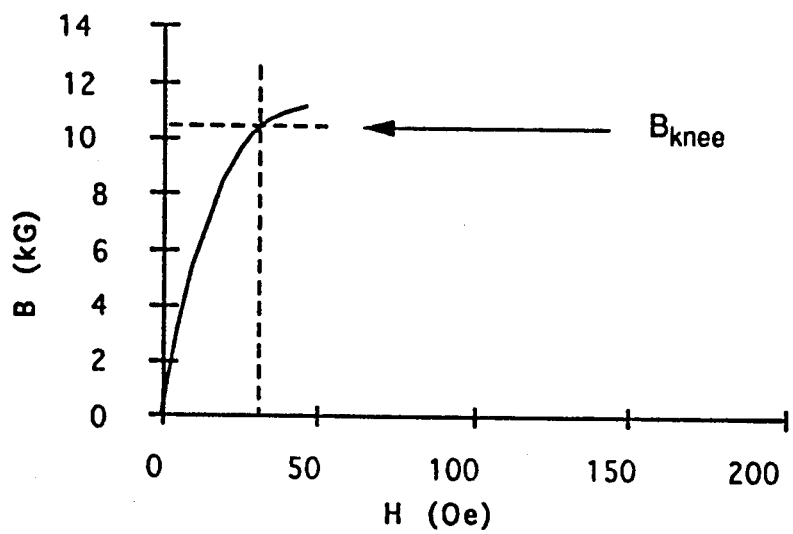

The value for $B_{opt}$ can be better understood by turning to FIGS. 4(a)-(c). FIG. 4(a) is the plot of the responsiveness of the MR fluid earlier described to magnetic field strength (magnetic flux density B vs magnetic field strength H). The magnetic flux density B has two component parts: $B_{intrinsic}$, that is, solely attributable to the fluid, and a magnetic field component having a value of $\mu_o H$, where $\mu_o$ is a magnetic permeability constant, and H is the strength of the magnetic field which can be approximated by multiplying the number of turns N in coil 40 times the current I through coil 40 divided by twice the gap g. $B_{intrinsic}$, or the magnetic polarization J, as it is also known, is equal to the total flux density B less the component attributable to the field strength. That is, $$B_{intrinsic} = J = B - \mu_o H$$

FIG. 4(b) is a plot of J vs H for the same MR fluid represented in FIG. 4(a). It is difficult to identify, with any precision, where the optimum operational point is for this MR fluid by looking only at FIG. 4(b). The curve suggests that there is a non-linear increase in the value of B for H values between 100,000 and 318,000 A/m (1300 and 4000 oersteds). A more definitive method of determining a value of $B_{opt}$ is to plot the square of J vs H. This curve is shown in FIG. 4(c). $B_{opt}$ is associated with the field strength H at which the slope of the $J^2$ vs H curve $$\left( \frac{d(J^2)}{d(H)} \right)$$

equals $$\frac{J^2}{H},$$

that is at the point of tangency to the curve for the curve's secant tangent. For this MR fluid and, indeed, for many of the fluids which have been tested, $B_{opt}$ occurs at a value of H=100,000 A/m (1300 oersteds), and for this fluid has a value of 0.635 tesla (6350 gauss) as seen in FIG. 4(a).

While this is a valid operational criteria, it is desirable to have as much energy in the fluid as possible and as little in the steel; that is, operationally we would like the ratio of $$\frac{E_f}{E_s}$$

to be as large as possible where $E_f$ is the energy in the fluid and $E_s$ is the energy in the steel. $E_f$ and $E_s$ are given by the following expressions:

$$E_f = \tfrac{1}{2} B_f H_f V_f$$

where $V_f$ is the operational volume of fluid, and $$E_s = \tfrac{1}{2} B_s H_f V_s$$

where $V_s$ is the operational volume of the steel.

$$\frac{E_f}{E_s} \approx \frac{\tfrac{1}{2} B_f H_f A_{pole} \, g}{\tfrac{1}{2} B_s H_s A_{core} L_s} \approx \frac{2 H_f g}{H_s L_s}$$

where $L_s$ is the length of the entire flux path through the steel.

The damper 16 must be operated below $B_{knee}$ for the steel as shown in FIG. 4(d), for conventional steels and FIG. 4(e) for powdered metals. It is readily apparent that $H_s$, and hence $E_s$, go up quite rapidly for increases in H above the value corresponding to $B_{knee}$ with little or no increase in the flux density, B. From FIG. 4(d), $B_{knee}$ has a value of 1.4 tesla (14000 gauss). By way of example, then, for this MR fluid and this steel, the ratio of $B_{opt}$ to $B_{knee}$ has a value of 0.454. More generally, this ratio should be greater than 0.4. The dimensional parametric ratios should be greater than or equal to this critical value. The value for powdered metals will be larger since $B_{knee}$ occurs at a smaller value.

The $B_{opt}$ taken from FIG. 4(c) represents a minimum value. $B_{opt}$ can have higher values than B=0.635 tesla, so long as the flux density in the steel is not greater than $B_{knee}$ and as long as the ratio $$\frac{B_{opt}}{B_{knee}}$$

remains equal to or less than the bottleneck ratios, $$\frac{A_{core}}{A_{pole}}, \frac{A_{path}}{A_{pole}}.$$

By increasing $B_{opt}$ above 0.635 tesla (6350 gauss), up to a maximum of about 1.011 tesla (10,110 gauss) at H=279,000 A/m (3500 oersted) for this configuration, more energy is input to the fluid while maintaining these desired operational parameters. This increases the ratio $$\frac{E_f}{E_s}$$

enhancing performance. What these relationships really tell the damper designer is that beyond a certain point, it is necessary to depart from rule 1 (minimize $A_{core}$ and $A_{path}$) in order to permit additional energy to be input into the fluid, rather than operating the damper in an inefficient operational zone (e.g., above $B_{knee}$).

In order to demonstrate the importance of these relationships, three dampers were constructed and tested. The dimensions of these dampers are shown in Table I.

TABLE I

|  | Damper #1 | Damper #2 | Damper #3 |
|---|---|---|---|
| $D_{core}$ | 34 mm | 30 mm | 30 mm |
| $D_{pole}$ | 43 mm | 42 mm | 42 mm |
| $D_o$ | 57.2 mm | 57.2 mm | 57.2 mm |
| $D_I$ | 46 mm | 46 mm | 46 mm |
| $L_g$ | 10 mm | 8.8 mm | 15 mm |
| N | 199 turns of 23 gauge wire | 125 turns of 22 gauge wire | 125 turns of 22 gauge wire |
| $A_{core}$ | 908 mm² | 707 mm² | 707 mm² |
| $A_{pole}$ | 1350 mm² | 1161 mm² | 1978 mm² |
| $A_{path}$ | 908 mm² | 908 mm² | 908 mm² |
| $\frac{A_{core}}{A_{pole}}$ | 0.673 | 0.608 | 0.357 |
| $\frac{A_{path}}{A_{pole}}$ | 0.673 | 0.260 | 0.459 |

Figure 5:
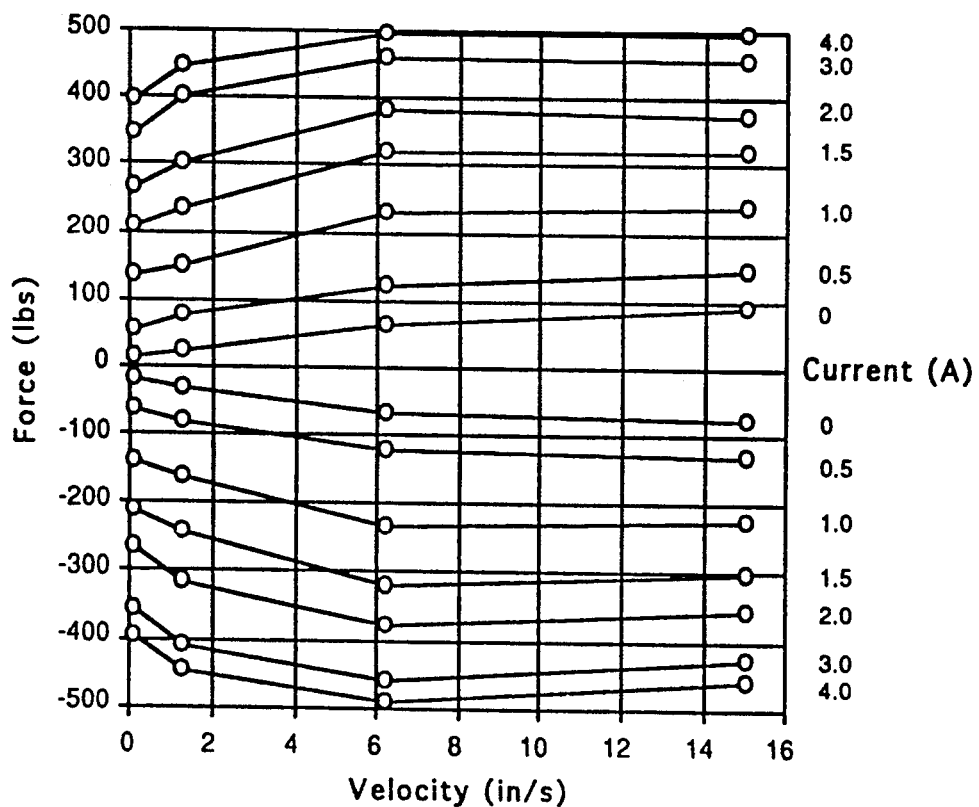
FIG. 5(a) is a peak force (F) vs peak velocity (V) plot for different levels of current for a first damper configuration, with extension forces being shown as having negative values.
FIG. 5(b) is a peak force vs peak velocity plot for different levels of current for a second configuration which does not meet the preferred criteria for $A_{path}/A_{pole}$ with extension forces being shown as having negative values.
FIG. 5(c) is a peak force vs peak velocity plot for different levels of current for a third configuration which does not meet the preferred criteria for $A_{core}/A_{pole}$ with extension forces being shown as having negative values.
Figure 5:
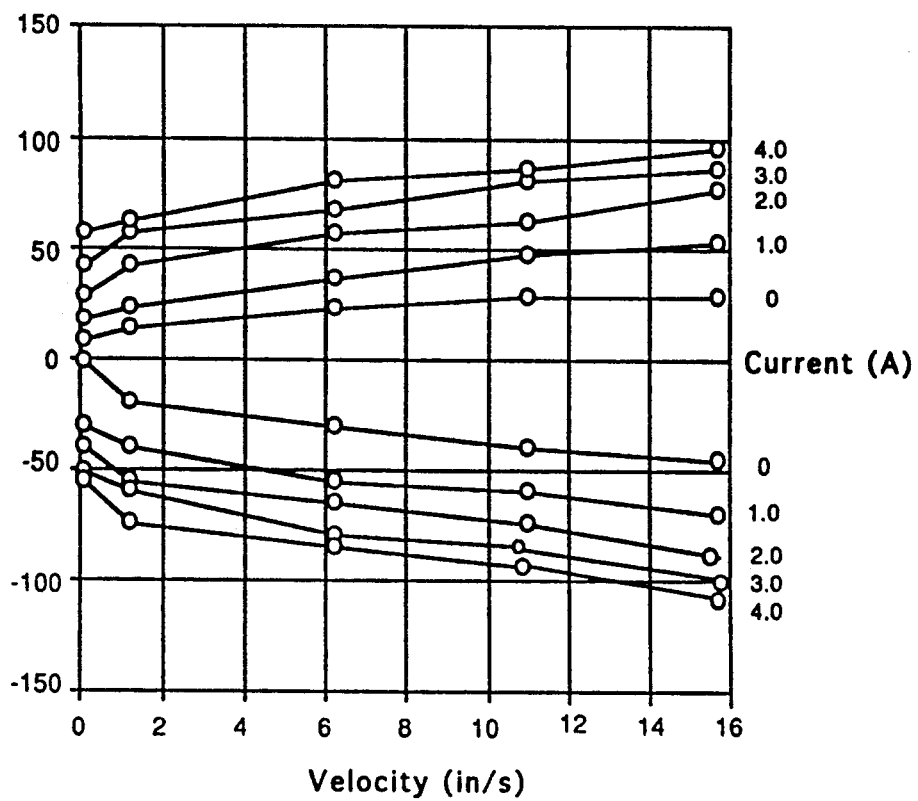
Figure 5:
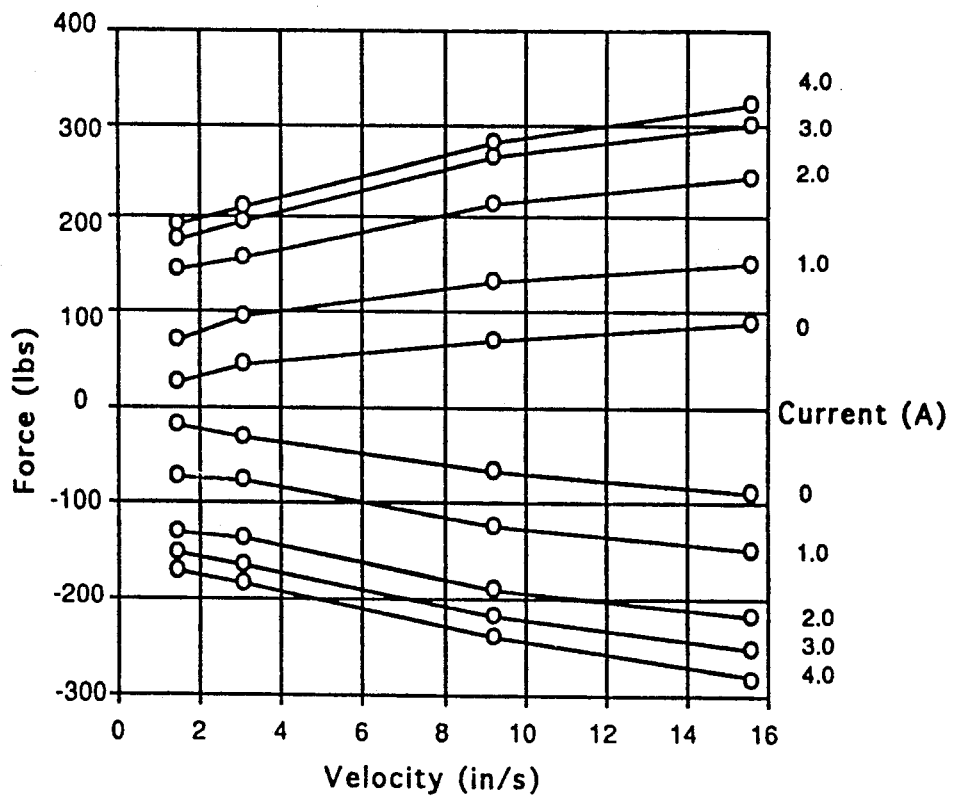

As was mentioned earlier, one desirable characteristic of an MR damper is for it to be velocity independent. FIGS. 5(a)-(c) establish that a damper made in accordance with these parameters achieve velocity independence. The three dampers used to construct Table I were tested under substantially similar conditions and the results are plotted in FIGS. 5(a)-(c), respectively. Damper 1 meets the criteria for both ratios of $A_{core}$ and $A_{path}$ to $A_{pole}$, (i.e., both values are equal to or exceed 0.454), while Damper 2 is below specification for $A_{path}$ and Damper 3 is below specification for $A_{core}$. As the FIGS. 5(a)-(c) indicate, the performance for Damper 1 is substantially velocity independent, while those for Dampers 2 and 3 are not (as is indicated by the slope of the curves). Further, the optimized configuration of Damper 1 is capable of achieving significantly higher compression (positive) and extension (negative) forces for the same levels of current, as compared to those achievable by Dampers 2 and 3.

Figure 6:
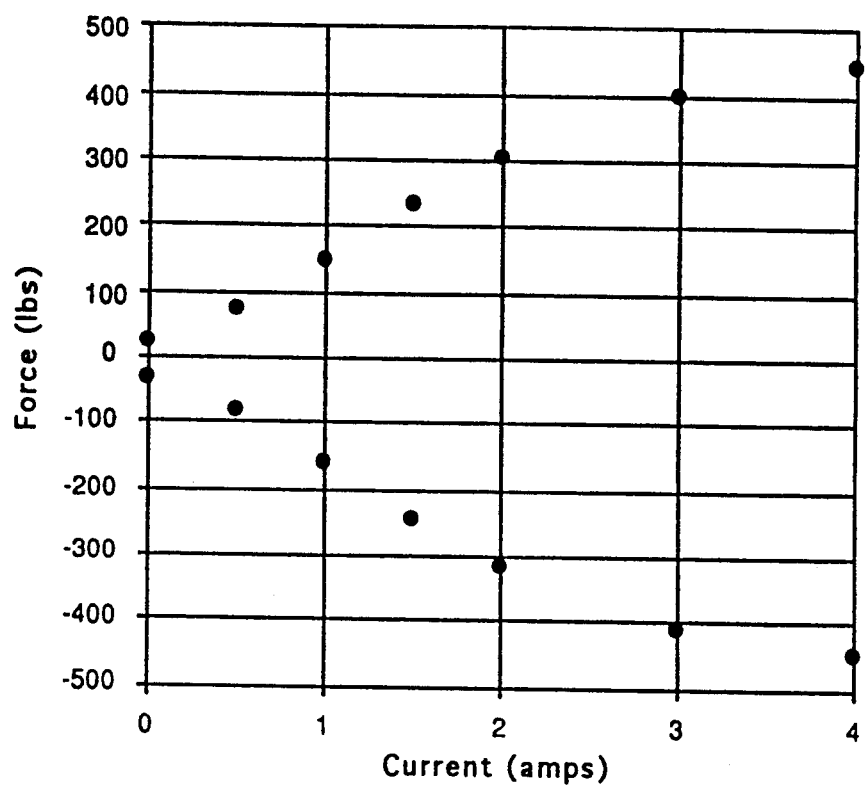
FIG. 6(a) is a peak force (F) vs current (A) plot for the first configuration operated at a stroke rate of 0.2 Hz and an amplitude of ±1.0 in. (peak velocity is 1.3 in./sec) with extension forces being shown as having negative values.
FIG. 6(b) is a peak force vs current plot for the second configuration operated at a stroke rate of 0.2 Hz and an amplitude of ±1.0 in. (peak velocity is 1.3 in./sec) with extension forces being shown as having negative values.
FIG. 6(c) is a peak force vs current plot for the third configuration operated at a stroke rate of 0.23 Hz and an amplitude of ±1.0 in. (peak velocity is 1.5 in./sec) with extension forces being shown as having negative values.
Figure 6:
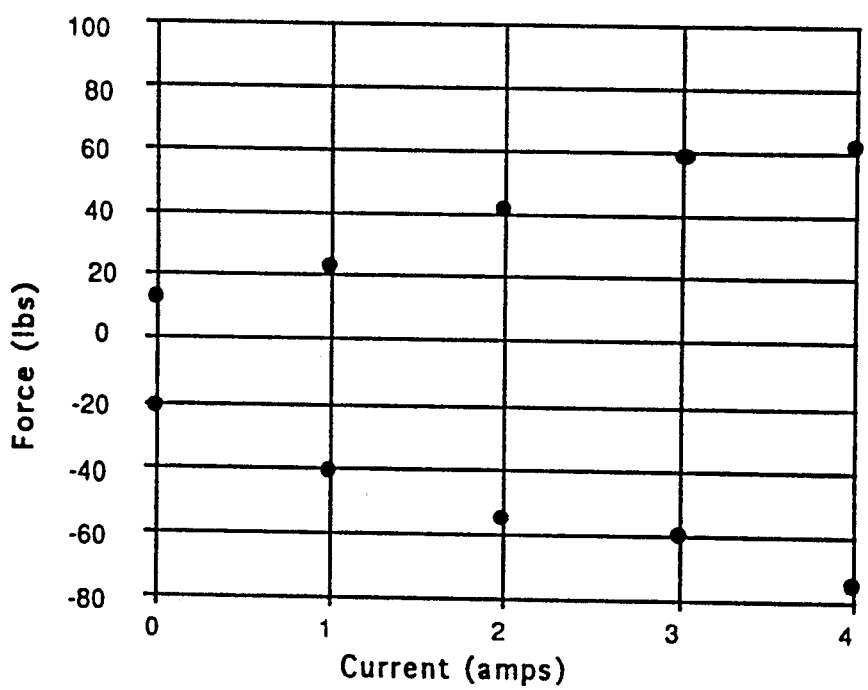
Figure 6:
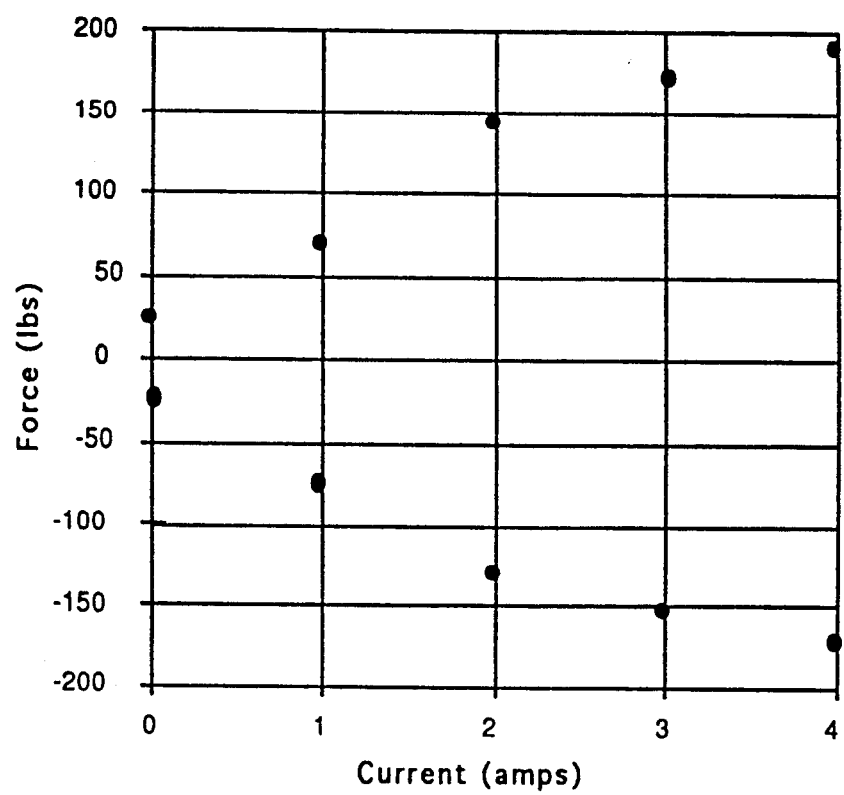

These results are confirmed by the plots shown in FIGS. 6(a)-(c) wherein force is plotted vs current for these same three dampers for substantially similar stroke rates and stroke lengths. Specifically, FIG. 6(a) for Damper 1 and FIG. 6(b) for Damper 2 were taken at a stroke rate of 0.20 Hz, an amplitude of ±1.0 inch and a peak velocity of 1.3 in/sec. Data for FIG. 6(c) for Damper 3 were taken at a stroke rate of 0.23 Hz, an amplitude of ±1.0 inch and a peak velocity of 1.3 in/sec.

Figure 7:
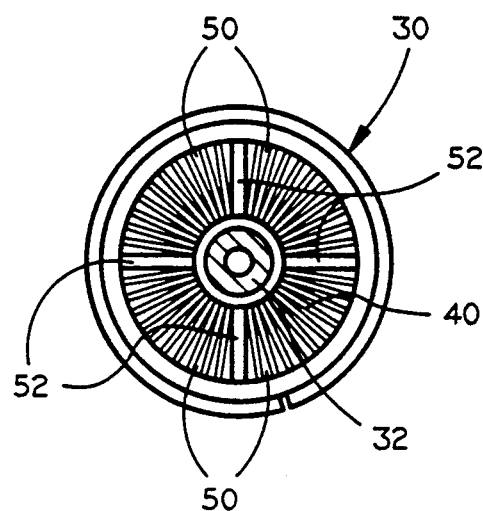
FIG. 7 is a top view of a piston having a plurality of toroidally wound magnet sections, with the rod sectioned.
Figure 8:
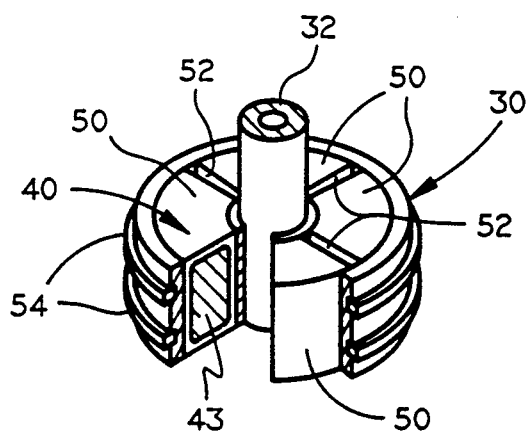
FIG. 8 is an isometric view partially in section of the piston of FIG. 7.

FIGS. 7 and 8 depict a second embodiment of the piston 30 useful in damper 16. In this embodiment, coil 40 is toroidally wound about a core element 43, which may be of low carbon steel or powdered metal. Actually, the toroidal coil is formed by four segments 50 with the terminal wire from one segment initiating winding of the adjacent segment 50. In between segments 50 are four valve slots 52 to permit fluid flow through piston 30. Twin seals 54 extend about the periphery of piston 30 and engage the inner diameter of housing 20 (FIG. 2) to create a fluid seal. The MR fluid 18 is, therefore, forced to flow through slots 52 and control of the flow of current through coil 40 can closely control the flow characteristics of the MR fluid.

Figure 9A:
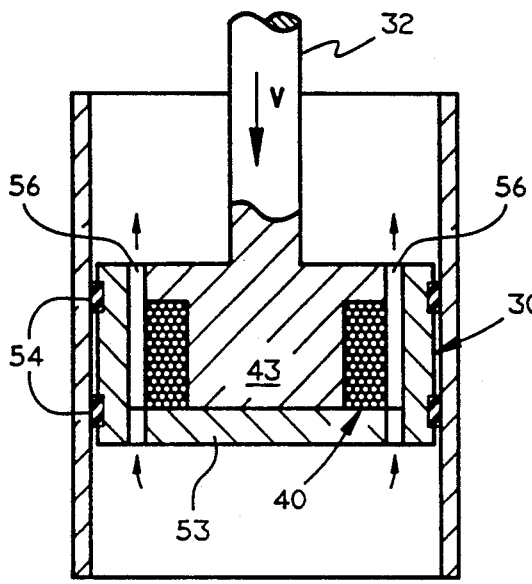
FIGS. 9(a), 9(b), 9(c) and 9(d) are cross-sectional side views of first through fourth piston embodiments with incorporated internal valve structure.

Four additional alternative embodiments of the piston 16 are depicted in FIGS. 9(a)-(d). FIG. 9(a) depicts an embodiment in which coil 40 is wound on core element 43 and slipped into cup member 53. Cup member 53 has a plurality of passageways 56 formed therein, has twin seals 54 extending about the periphery, and is attached to core element 43 by means such as threaded fasteners, not shown.

Figure 9B:
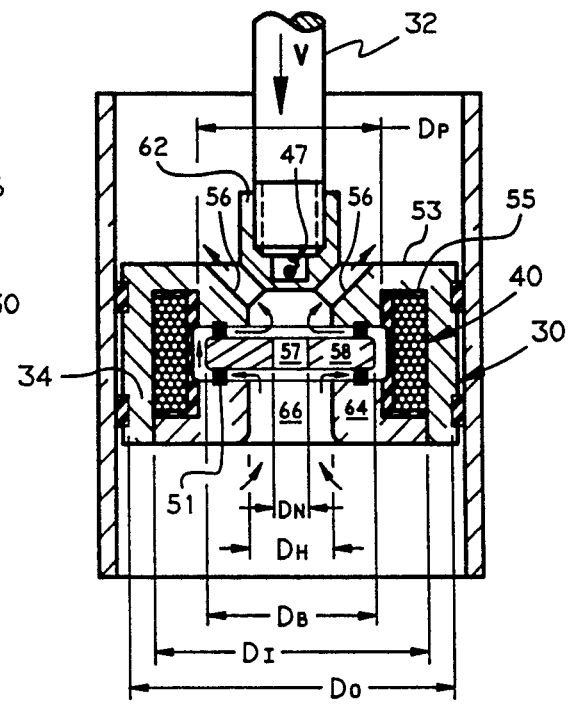
Figure 9C:
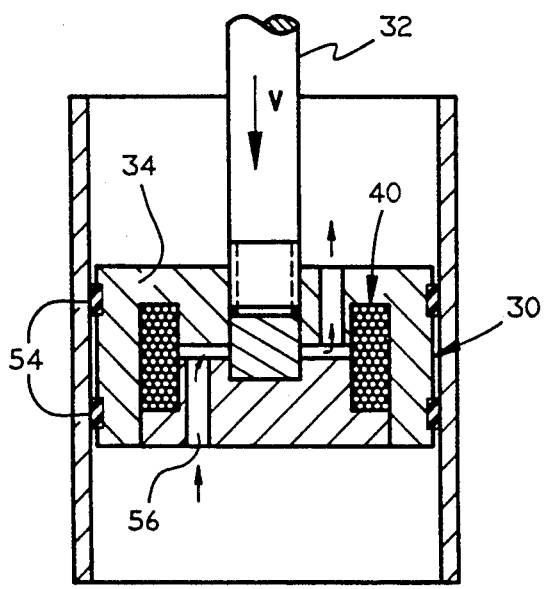
Figure 9D:
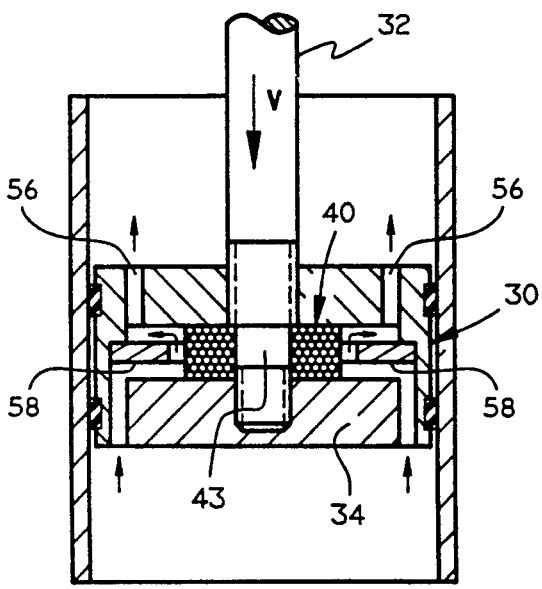

The ram effects of the fluid will be undesirable for certain applications and FIGS. 9(b)-(d) disclose various baffle plate designs to cope with this problem. FIG. 9(b) is the first such baffle plate design. Coil 40 is wound upon a thin, cylindrical non-magnetic sleeve 55 which is then received in cup-shaped member 53. The internal portions of cup-shaped member 53 including contained passageways 56 can easily be machined prior to insertion of coil 40.

Baffle plate 58 is retained in position by non-magnetic supports 51 which may be adhered to the surface of plate 58. Cup-shaped member 53 is formed with an extension 62 which is threaded onto piston rod 32. End cap 64 fits within the lower end of coil 40 and may be retained there by conventional means (fasteners, welding or peripheral threads engaging internal threads in cup-shaped member 53). A central hole 66 in end cap 64 permits flow through the piston, baffle plate 58 serving to diminish ram effects and extending the length of the fluid path in which the MR fluid is under the influence of the magnetic field. A hole 57 may optionally be provided in plate 58, depending upon the desired flow characteristics.

In this (FIG. 9(b)) embodiment, the return path for the magnetic flux is through the radially outer reaches of piston head 34, with $D_I$ being the inner dimension of the flow path and $D_O$ being the outer dimension thereof. $D_B$ is the diameter of the baffle plate 58, $D_P$ is the diameter of the pole (the inside diameter of the coil) and $D_H$ is the diameter of the hole 66. The diameter of baffle plate hole 57 is $D_N$. The magnetic flux will pass through the most apparently "solid" magnetically conductive path, (i.e., with only minimal gaps and no obstructions).

The critical bottleneck dimensions are, then, expressed as follows:

$$A_{core} = \frac{\pi(D_E^2 - D_N^2)}{4},$$

$$A_{path} = \frac{\pi(D_G^2 - D_I^2)}{4},$$

$$A_{pole} = \frac{\pi(D_P^2 - D_H^2)}{4}.$$

Each different geometry has its own associated equations which define its operational characteristics.

FIG. 9(c) depicts an embodiment in which piston head 34 contains a single passageway 56 with a lateral, partially circular portion. FIG. 9(c) depicts this lateral portion as extending through 180°, although the passageway could obviously extend through a larger or a smaller circular arc.

FIG. 9(d) depicts an alternate baffle plate embodiment in which the coil 40 is wound upon the end of piston rod 32. Care must be taken with this embodiment to make the core portion 43 of piston rod 32 of sufficient diameter to avoid saturation of the core.

Figure 10A:
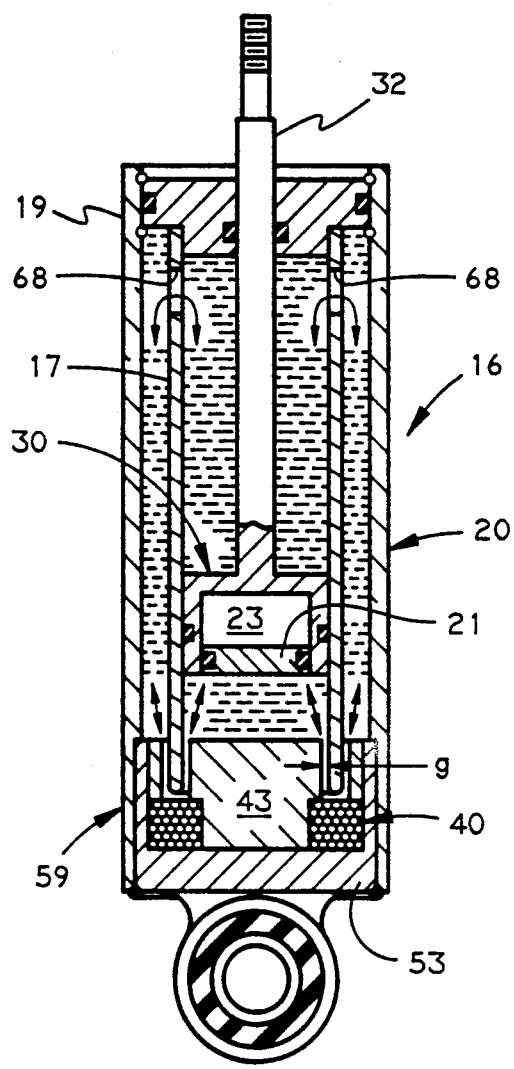
FIG. 10(a) is a cross-sectional side view of a first twin-tube housing configuration.

Each of the embodiments discussed thus far, incorporate the magnetic coil 40 into piston head 34. In some applications it may be preferable for the coil to be associated with housing 20, if housing 20 is more stationary, to minimize flexing of wires. The three embodiments shown in FIGS. 10(a)-(c) each employ a twin-tube housing 20 which allow the coil 40 to be located stationarily relative to the housing. Housing 20 has a first inner tube 17 and a second outer tube 19. Valve member 59 comprises coil 40 which is wrapped around core element 43 and the end of inner tube 17 is stabilized between core element 43 and cup-shaped end member 53 by spacers (not shown) to define the gap g of valve member 59. Accumulator 23 is incorporated into piston head 34. As shown, a floating piston 21 can be used to create the accumulator 23 or, as mentioned with respect to earlier embodiments, a rolling diaphragm of a type similar to that taught in U.S. Pat. No. 4,811,919, which is hereby incorporated by reference, may be used. Any type of accumulator may be used.

As the piston 30 experiences a compressive stroke, the MR fluid is a) forced through gap g, which (in conjunction with coil 40) functions as a valve, b) into outer tube 19, c) through openings 68 back into the inner tube 17. The flow characteristics of MR fluid 18 will be controlled by regulating the current flow in coil 40, as with previous embodiments.

Figure 10B:
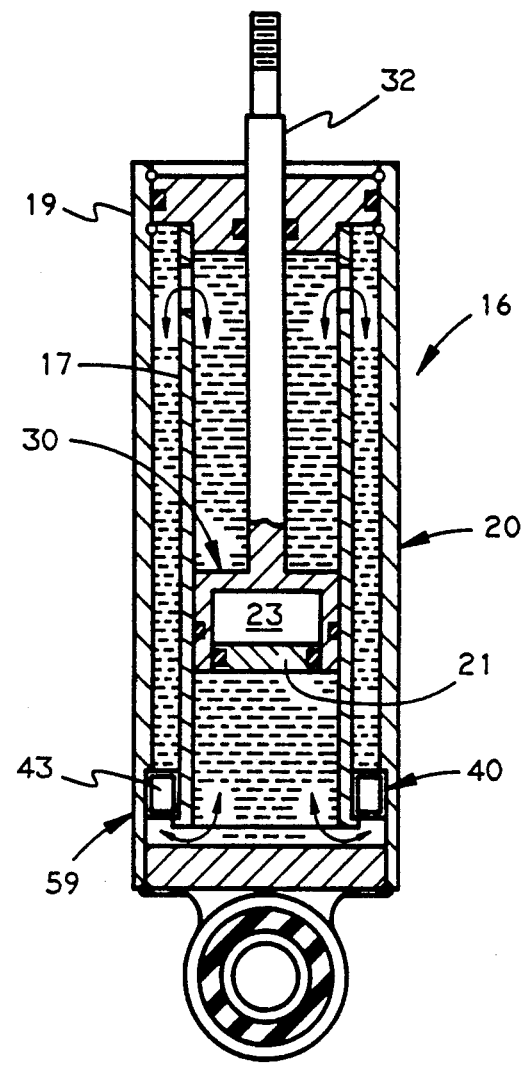
FIG. 10(b) is a cross-sectional side view of a second twin-tube housing configuration.

FIG. 10(b) shows a similar twin tube housing 20 in which coil 40 is toroidally wound about core 43 in segments with intermittent slots as in the FIG. 8 embodiment. The slots, in conjunction with the coil 40 will function as the valve for the MR fluid 18 in this embodiment.

Figure 10C:
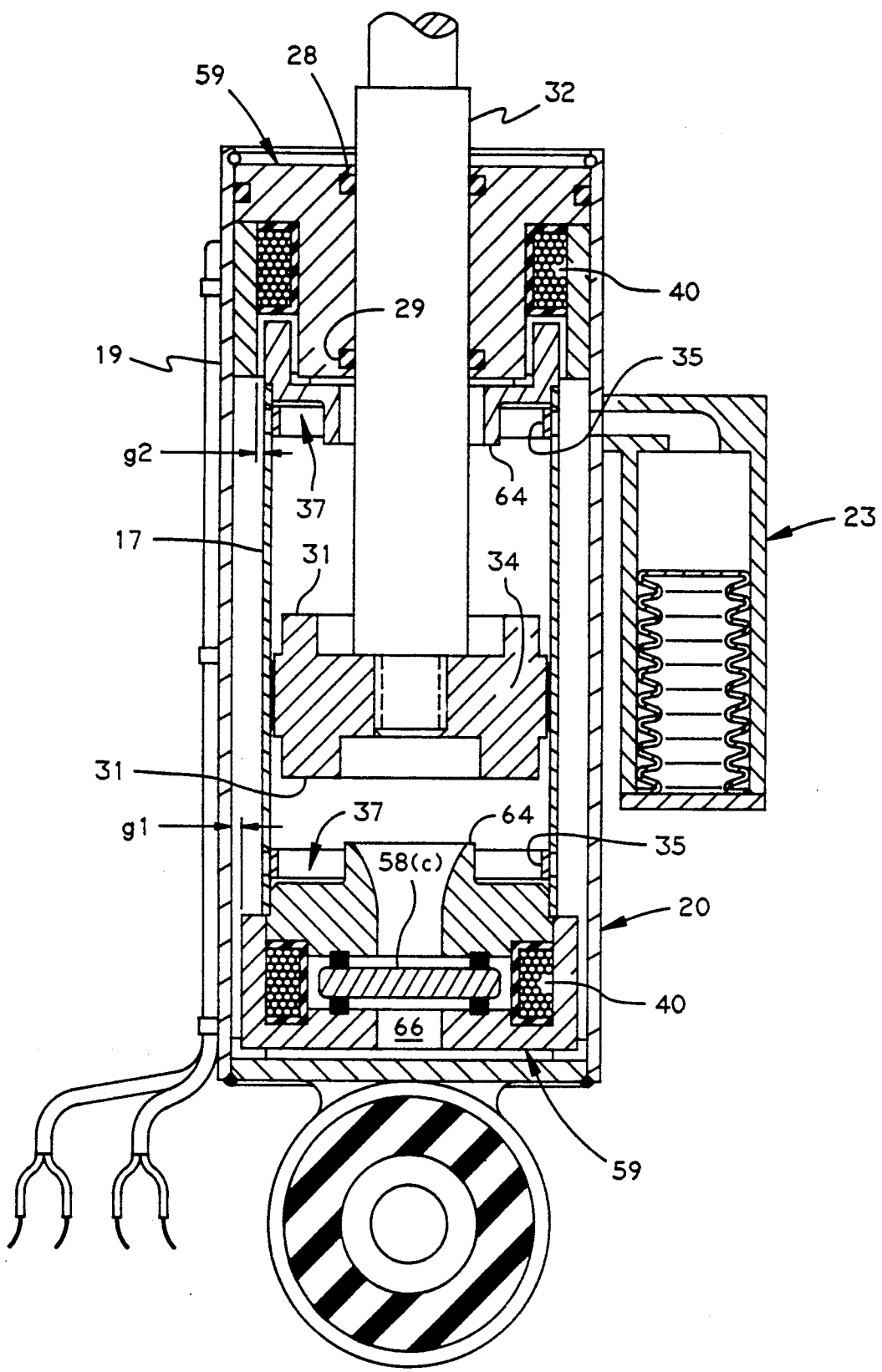
FIG. 10(c) is a cross-sectional side view of a third twin-tube housing configuration employing two magnetic valves.

FIG. 10(c) demonstrates a third embodiment of a damper 16 which has a twin tube housing 20. In this embodiment, two coils 40 are used, the lower coil 40 and gap $g_1$ form the valve for controlling flow of the compressive stroke while upper coil 40 and gap $g_2$ form the valve for controlling flow on the extension stroke. Lower valve member 59 is depicted as having a baffle plate 58', while upper valve member 59, which must permit passage of piston rod 32, is of a modified solenoidal design. Upper and lower check valves 35, which are preferably reed valves that flap open and closed responsive to fluid pressure, provide fluid bypass of upper and lower coils 40 for the compression and extension strokes, respectively.

An externally mounted accumulator 23 of the type shown in U.S. Pat. No. 4,858,898 is used in this embodiment which comprises an elastomeric bladder that may be filled with air or foam rubber. As with the other accumulators, accumulator 23 provides room for additional incompressible MR fluid resulting from displacement by piston rod 32 or from thermal fluid expansion. In this embodiment, no electrical connections are made through piston rod 32 and piston head 34 has a more conventional engagement with inner tube 17 (i.e., no fluid flow past or through). Recesses 37 form pockets which in conjunction with hydraulic end stops 31 trap fluid and prevent piston head 34 from banging into either end cap 64. This double-valve design is particularly useful for dampers generating large forces. In such applications, the use of two valves 59 provides more precise control and reduces the risk of cavitation of the fluid. Further, the forces generated in the compression and extension strokes can be individually tailored to fit the desired design parameters.

Figure 11A:
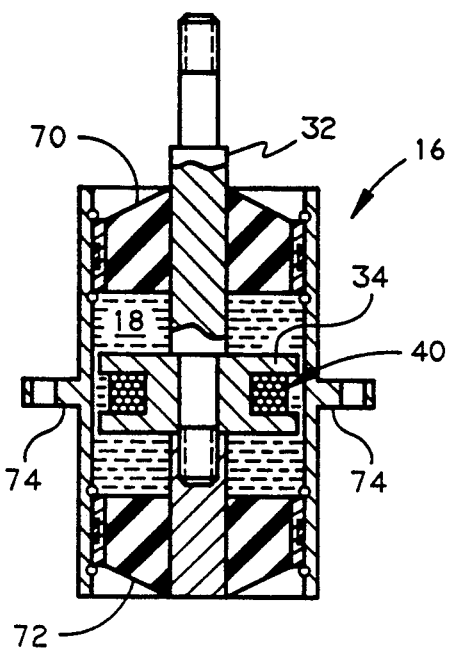
FIG. 11(a) is a schematic cross-sectional side view of a first sealless design.
Figure 11B:
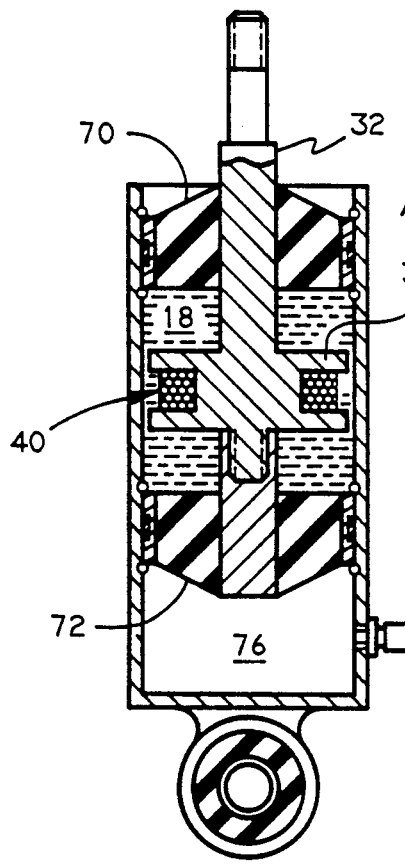
FIG. 11(b) is a schematic cross-sectional side view of a second sealless design.
Figure 11C:
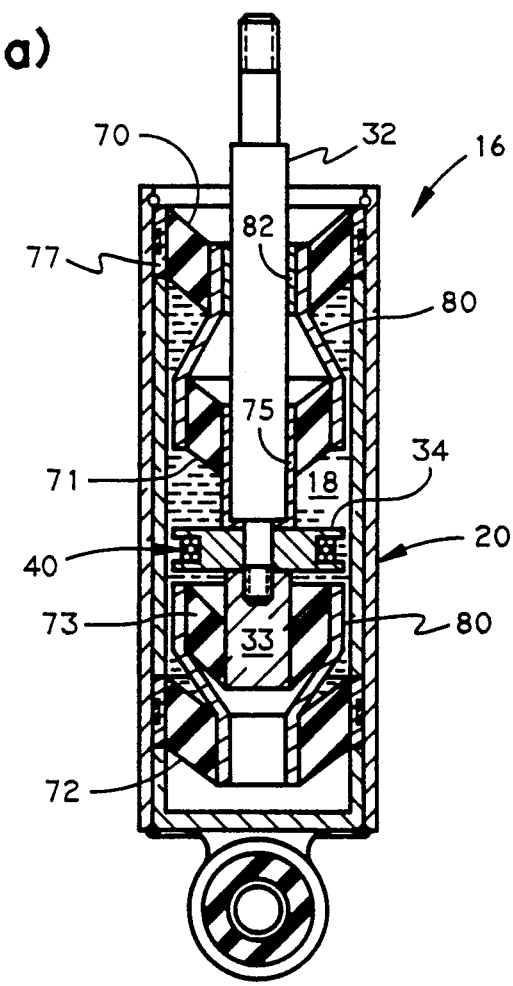
FIG. 11(c) is a schematic cross-sectional side view of a third sealless design.

FIGS. 11(a)-11(c) depict three embodiments of sealless dampers 16. One problem with the conventional damper design is preventing loss of the MR fluid which would result in diminished performance. Previously described embodiments have proposed the use of a secondary fluid with a combination scraper and seal to cope with this problem. A secondary problem is the need for an accumulator with the conventional designs to provide for fluid displaced by piston rod. With the sealless designs of FIGS. 11(a)-(c), the piston rod 32 extends above and below piston head 34 and has elastomer elements 70 and 72 which may be of frustoconical design, bonded to its upper and lower extents, respectively. Elastomer elements 70, 72 are also bonded to housing 20 trapping a fixed volume of fluid 18. An accumulator is unnecessary since there is no fluid displaced by piston rod 32 which cannot be accommodated by the volume on the opposite side of piston head 34. Depending on the bulge stiffness of the elastomer, the elements 70 and 72 can accommodate thermal expansion of the fluid. Electrical connection is made to coil 40 through shaft 32, as in earlier embodiments. Ears 74 (FIG. 11(a)) provide means for attaching housing 20 to one of the two elements to be isolated with piston rod 32 being attachable to the other.

The embodiment of FIG. 11(b) affords a means of providing greater resistance to compressive forces than to extension forces by pressurizing (or charging) chamber 76.

FIG. 11(c) shows a third sealless embodiment designed to provide extended stroke. As shown in FIG. 11(c) damper 16 is shown at the completion of a compression stroke. Disc shaped elastomer 70 is bonded at its outer extremity to a ring 77 which sits atop the inner cylinder of housing 20 and its inner periphery is bonded to element 80, which is preferably metallic. The upper inner periphery of element 80 slides freely relative to piston rod 32 by virtue of bearing 82. The lower inner periphery of element 80 is bonded to the outside of disc-shaped elastomer 71 whose inner periphery is bonded to cylindrical sleeve 75. Sleeve 75 moves with piston rod 32 but its use (being separable therefrom) facilitates manufacture.

A second element 80 has the outer periphery of disc-shaped elastomer 72 bonded to its inner upper periphery. The inner periphery of disc 72 is bonded to piston rod extension 33. A fourth disc-shaped elastomer element 73 is bonded to the outer lower periphery of second element 80 and to ring 78 which is trapped between portions of housing 20 and, functionally, becomes a part thereof. This embodiment permits the throw length of damper 16 to be extended and, obviously, additional throw length could be added as necessary by stacking additional elements 80 with associated disc-shaped elastomers 70–73.

Figure 12B:
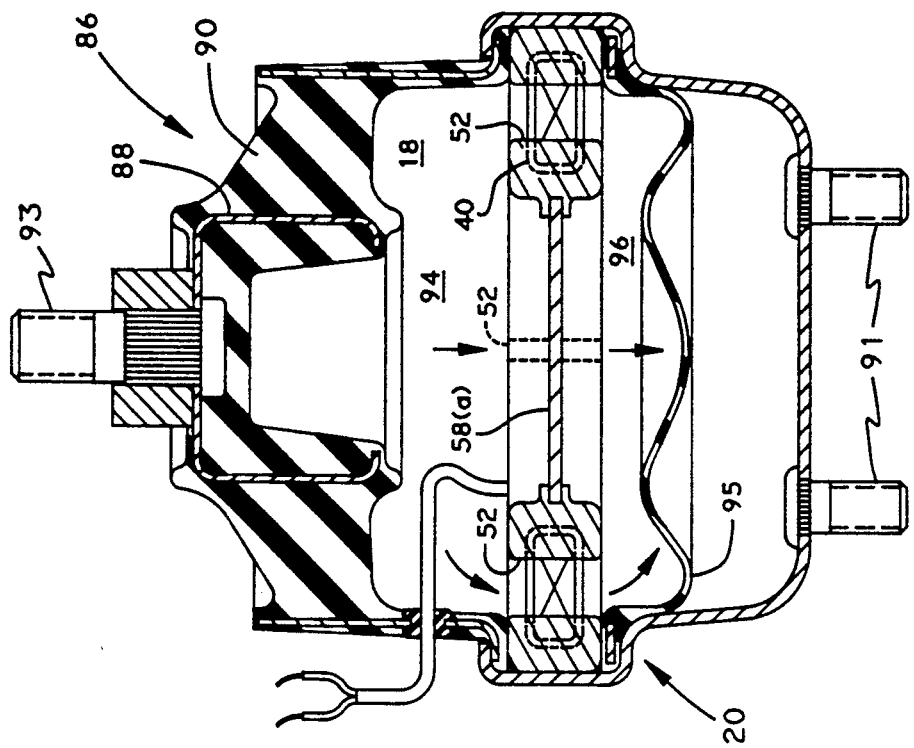
FIG. 12(a) is a schematic cross-sectional side view of a first mount configuration employing an MR fluid; and, FIG. 12(b) is a schematic cross-sectional side view of a second mount configuration employing an MR fluid.
Figure 12A:
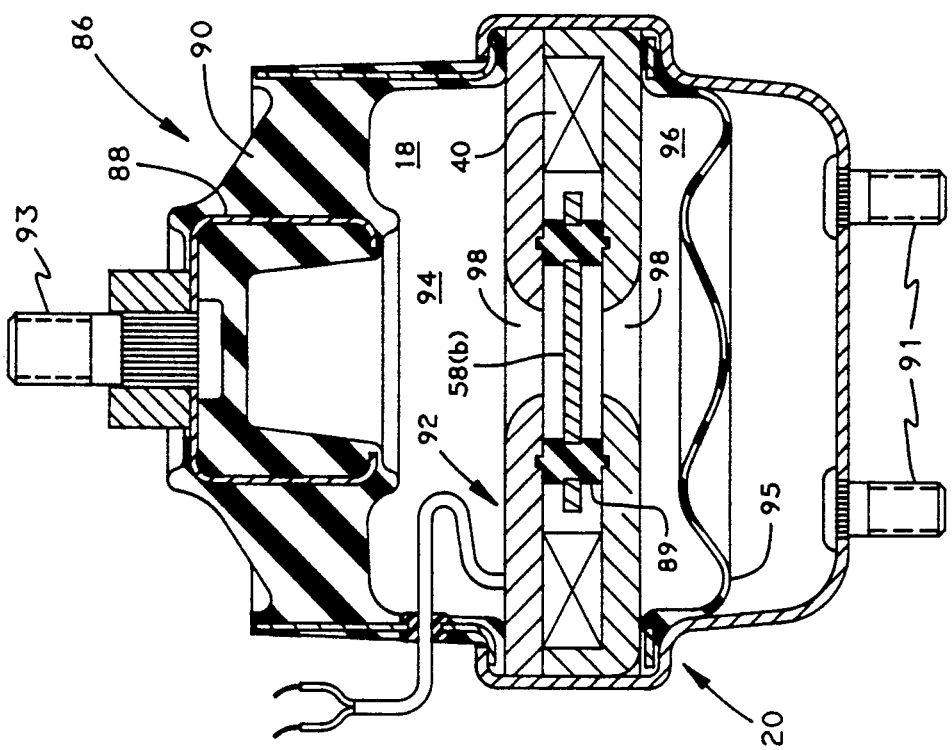

A pair of mounts employing the features of the present invention are depicted in FIGS. 12(a) and 12(b) generally at 86. The embodiment of mount 86 in FIG. 12(a) has a baffle plate 58 which is held in place by snap-in spacers 89, and a solenoid-type coil 40 wrapped within housing 20. Spacers 89 are made of a non-magnetic, preferably plastic material. Baffle plate 58 diverts the flow of the MR fluid into more intimate contact with coil 40 enhancing the flow control of the fluid by increasing the capability of the coil to influence the characteristics of the fluid. A first pair of bolts 91 provide means for attachment to a first member (a frame, or the like) and bolt 93 provides means for attachment to a second member (an engine, for example). Elastomeric element 90 is bonded to both attachment collar 88 and housing 20 and comprises the primary spring in the mount 86. Collar 88, elastomeric element 90 and upper surface of housing 92 for baffle plate 58 define a first chamber 94 for containing MR fluid. The lower surface of housing 92 and an elastomeric bladder 95 (which forms the bottom compliance of mount 86) define a second chamber 96 for MR fluid. The orifices 98 in housing 92 operate with coil 40 to define a valve for controlling the flow of the MR fluid, as in previous embodiments. The radial extent of orifices 98 is a design parameter which may be adjusted to influence operational characteristics of the mount 86.

The embodiment shown in FIG. 12(b) is similar to that shown in FIG. 12(a) in all particulars with the exception that the coil 40 is of the toroidal type with slots 52 serving as the fluid control valve as with the twin tube design depicted in FIGS. 10(b). The slots 52 serve as means to increase exposure of the MR fluid to the coil 40, thereby enhancing flow control. No baffle plate is necessary with this design, so a solid divider plate 58a is substituted.

The mounts 86 of FIGS. 12(a) and 12(b) allow the stiffness of the mount to be controlled in response to operational characteristics of the engine (idle vs high rpm), or vehicle (cornering or straight runs) by use of electronic sensors and control signals giving input to the energy supply of coil 40, in a conventional manner.

The present invention provides a number of embodiments of an MR fluid damper with a variety of novel characteristics. A first embodiment optimizes the dimensional and operational parameters of the damper to provide a high level of controllability. A second embodiment provides an alternate piston head with a toroidally wound magnet incorporated therein. Third through sixth embodiments provide piston heads with fluid flow therethrough (rather than therearound) and the magnetic flux path contained entirely within the piston head. A series of seventh through ninth embodiments provide alternate housing configurations in which the flow control magnet is associated with the housing, including one embodiment in which an upper and a lower flow control valve is used. Tenth through twelfth damper embodiments teach sealless dampers which eliminate loss of MR fluids and, finally, two MR fluid mount designs employing the features of the present invention are described.

Various changes, alternatives and modifications will become apparent to those of ordinary skill in the art following a reading of the foregoing description. For, example, while the piston motion being damped has implicitly been axial, it will be appreciated by those of ordinary skill in the art that dampers made in accordance with the specifics of this invention will be equally well adapted for damping rotary motion, or combinations of linear and rotary motion, as well. Further, although electromagnets have been described exclusively, it will be appreciated that permanent magnets may be utilized to provide some or all of the magnetic field. It is intended that all such changes, alternatives and modifications as come within the scope of the appended claims be considered part of the present invention.

We claim:

1. Apparatus for variably damping motion which employs a magnetorheological fluid, said apparatus comprising:
   a) a housing for containing a volume of magnetorheological fluid;
   b) a piston adapted for movement within said fluid-containing housing, said piston
      i) being comprised of a ferrous metal,
      ii) incorporating therein a number N of windings of an electrically conductive wire defining a coil which produces magnetic flux in and around said piston, and
      iii) being configured such that $$\frac{A_{core}}{A_{pole}} \cdot \frac{A_{path}}{A_{pole}} \geq \frac{B_{opt}}{B_{knee}}$$

where $A_{core}$ = a minimum lateral cross-sectional area of said piston within said coil, $A_{path}$ = a minimum lateral cross-sectional area of magnetically permeable material defining a return path for said magnetic flux, $A_{pole}$ = a surface area of a magnetic pole of said piston, $B_{opt}$ = an optimum magnetic flux density for said magnetorheological fluid, $B_{knee}$ = a magnetic flux density at which said ferrous metal begins to become saturated;

c) valve means associated with one of said housing and said piston for controlling movement of said magnetorheological fluid.

2. The apparatus of claim 1 wherein the return path for said magnetic flux comprises a portion of said piston outside said coil.

3. The apparatus of claim 2 wherein said housing has an inner diameter $D_I$ and an outer diameter $D_O$ and $$A_{path} = \frac{\pi(D_O^2 - D_I^2)}{4}.$$

4. The apparatus of claim 3 wherein said piston includes a baffle plate having a diameter $D_B$, a hole through said baffle plate having a diameter $D_N$, an entrance hole in the piston having a diameter $D_H$, and a diameter $D_P$ such that $$A_{core} = \frac{\pi(D_B^2 - D_N^2)}{4}$$

and, $$A_{pole} = \frac{\pi(D_P^2 - D_H^2)}{4}.$$

5. The apparatus of claim 1 wherein $$\frac{B_{opt}}{B_{knee}}$$

is $>0.4$.

6. The apparatus of claim 1 wherein said housing is comprised of a magnetically permeable material and said return path for said magnetic flux is at least partially through said housing.

7. The apparatus of claim 6 wherein said housing further comprises a sleeve encompassing an inner portion of said housing through which said piston moves to enlarge the cross-sectional area, $A_{path}$.

8. The apparatus of claim 6 wherein said piston comprises a generally cylindrically shaped member with a diameter D and a length L.

9. The apparatus of claim 8 wherein said housing has an inner diameter $D_I$ and an outer diameter $D_O$ and $$A_{path} = \frac{\pi(D_O^2 - D_I^2)}{4}.$$

10. The apparatus of claim 9 wherein said piston comprises a spool-shaped member in which a central portion of said spool receives the N windings of said coil.

11. The apparatus of claim 10 wherein said central portion has a diameter $D_{core}$, each flange portion has a thickness $L_g$ and a diameter $D_{pole}$ such that $$A_{core} = \frac{\pi D_{core}^2}{4}$$

and, $$A_{pole} = \pi D_{pole} L_g.$$

12. The apparatus of claim 11 wherein $B_{opt} = J_{opt} + \mu_o H$ where
$J_{opt}$ is defined as the point at which the slope of the $J^2$ vs H curve is $$\frac{J^2}{H}$$

J being a magnetic polarization of said magnetorheological fluid,
$\mu_o$ is a magnetic permeability constant, and H is a magnetizing force applied to the magnetorheological fluid.

13. The apparatus of claim 1 wherein said valve means is formed in said piston, a current level in said coil being used to control the amount of magnetorheological fluid flowing through said valve means.

14. The apparatus of claim 13 wherein said valve means comprise a plurality of slots extending substantially radially and longitudinally through said piston.

15. The apparatus of claim 13 wherein said valve means comprises a gap which extends at least partially circumferentially about said piston relative to said housing.

16. The apparatus of claim 1 wherein said housing further comprises a twin-tube, said piston being adapted for movement within a first inner tube and a second outer tube being fluidically interconnected to said first inner tube by two sets of apertures.

17. The apparatus of claim 16 wherein one set of apertures is formed as an opening adjacent an end of said first inner tube and in a cylindrical magnetic element.

18. The apparatus of claim 17 further comprising a cylindrical magnetic element associated with each of said two sets of apertures.

19. The apparatus of claim 1 further comprising a first scraper mounted in an upper portion of said housing for engaging a portion of a piston rod attached to said piston, and a seal also engaging said piston rod, said scraper and seal cooperating to retain said magnetorheological fluid within said housing.

20. Apparatus for variably damping motion using a magnetorheological fluid, said apparatus comprising
   a) a housing element for containing a volume of magnetorheological fluid, said housing including a first inner tube and a second outer tube;
   b) means to fluidically interconnect said first and second tubes, said means including at least one first opening near a first end of said first and second tubes and at least one second opening near a second end of said first and second tubes;
   c) a piston mounted upon a piston rod for movement within said first tube;
   d) valve means for controlling flow of said magnetorheological fluid associated with at least one of said first and second openings, said valve means including
      i) passageway means through which said magnetorheological fluid flows;
      ii) a magnetic coil for altering at least one flow characteristic of said magnetorheological fluid within said housing element to control a flow rate at which said fluid passes through said passageway means;
   e) pressure relief means for preventing fluid pressure buildup within said housing.

21. The apparatus of claim 20 wherein said pressure relief means comprises an accumulator for accommodating fluid expansion and fluid displaced by said piston rod.

22. The apparatus of claim 20 wherein said pressure relief means comprises at least one check valve.

23. The apparatus of claim 22 wherein said magnetic coil comprises a plurality of toroidally wound magnetic segments and said valve means comprise a plurality of slots which extend substantially radially and longitudinally in between said toroidally wound magnetic segments.

24. Apparatus for variably damping motion using a magnetorheological fluid, said apparatus comprising
   a) a housing containing a volume of magnetorheological fluid;
   b) a piston for movement in said housing through said magnetorheological fluid;

c) valve means for controlling movement of said magnetorheological fluid within said housing, said valve means including
  i) a magnetic coil formed as a plurality of toroidally wound magnet segments for altering at least one flow characteristic of said magnetorheological fluid;
  ii) a plurality of openings formed between said segments of said coil through which said magnetorheological fluid flows.

25. The apparatus of claim 24 wherein said plurality of toroidally wound magnet segments are formed on said piston.

26. The apparatus of claim 25 wherein each of said plurality of openings comprises a slot extending substantially radially and longitudinally between said toroidally wound magnet segments.

27. The apparatus of claim 24 further comprising a twin-tube housing where said plurality of toroidally wound magnetic segments are positioned adjacent one end of a first inner tube of said twin-tube housing.

28. The apparatus of claim 27 further comprising valve means including a plurality of torodially wound segments positioned adjacent each end of said first inner tube of said twin-tube housing.

* * * * *

UNITED STATES PATENT AND TRADEMARK OFFICE
CERTIFICATE OF CORRECTION

PATENT NO. : 5,277,281
DATED : January 11, 1994
INVENTOR(S) : Carlson et al.

It is certified that error appears in the above-identified patent and that said Letters Patent is hereby corrected as shown below:

Col. 6, line 53, insert the following:

--Since, $V_f \approx 2 A_{pole} \, g$ and $V_s \approx A_{core} L_s$, then--

Signed and Sealed this

Twelfth Day of July, 1994

*Attest:*

BRUCE LEHMAN

*Attesting Officer*   *Commissioner of Patents and Trademarks*